G. H. HENKEL & W. C. WARD.
PRUNING-IMPLEMENT.

No. 169,359. Patented Nov. 2, 1875.

Witnesses:
Richard Brown
Nelson Williams

Inventor:
George H. Henkel
Wm. C. Ward
By H. P. K. Peck
Atty.

UNITED STATES PATENT OFFICE.

GEORGE H. HENKEL AND WILLIAM C. WARD, OF MIDDLETOWN, OHIO.

IMPROVEMENT IN PRUNING IMPLEMENTS.

Specification forming part of Letters Patent No. 169,359, dated November 2, 1875; application filed November 27, 1875.

*To all whom it may concern:*

Be it known that we, GEORGE H. HENKEL and WILLIAM C. WARD, of Middletown, in the county of Butler and State of Ohio, have invented a new and useful Improvement in Pruning-Shears; and we do hereby declare that the following is a full, clear, and exact description thereof, reference being had to the accompanying drawings and to the letters of reference marked thereon.

Figure 1:
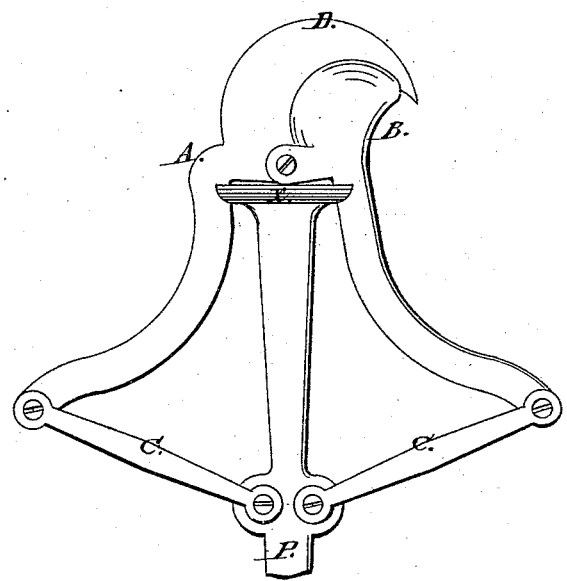
Figure 2:
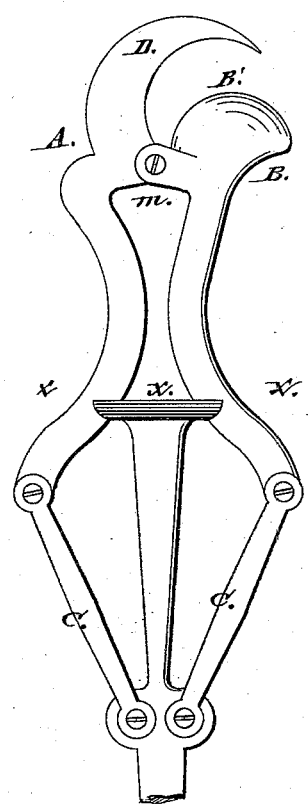
Figure 3:

Figure 1 represents a side view of our improved pruning-shears with the blades distended. Fig. 2 represents a similar view of the same with the shears closed. Fig. 3 represents a transverse section, taken at the line $x\, x$ of Fig. 1, and shows the construction of the slotted head or slide.

Our pruning-shears cut the limbs by an upward or thrusting action of the handle, and our invention relates to the follower which closes the shears.

In the drawings, A B denote the two branches of the shears, the ends of the shanks of which are connected by pivots with hinged links or rods C C, which at their lower ends are hinged to the pole P. The shanks are pivoted together at $m$. The upper end of pole P is provided with the cross-head $x$, having at each end a slot or groove, in which the shanks of the shears fit and work, as represented in the drawings. Branch A has a hooked blade, D, which is furnished with a projecting point that catches the limb to be severed and holds it against the cutting action of the shear-blade B′, and also serves as a shear-blade.

When a limb is caught upon the hook or point of the upper blade, the operator, who will stand upon the ground, by a gentle pull of pole P will cause the mouth of the shears to open and the cross-head $x$ will descend, and the limb will be allowed to pass between the blades D and B′. Then the operator will thrust the pole P upward, causing the cross-head $x$ to follow up the curved inclined edges of the shanks, which will close the blades of the shears and sever the limb.

We claim as our invention—

In a pruning implement, in which the blades are closed upon the limb by an upward thrust of the handle, the guide, follower, or cross-head in which the shanks of the shear-blades work.

Witness our hands this 12th day of November, A. D. 1874.

GEO. H. HENKEL.
W. C. WARD.

Witnesses:
W. H. TODHUNTER,
H. P. K. PECK.